(12) United States Patent
Jen et al.

(10) Patent No.: US 8,294,818 B2
(45) Date of Patent: Oct. 23, 2012

(54) DE-INTERLACING METHOD AND CONTROLLER THEREOF

(75) Inventors: Li-Huan Jen, Hsinchu Hsien (TW); Hung-Yi Lin, Hsinchu Hsien (TW); Zhi-Ren Chang, Hsinchu Hsien (TW)

(73) Assignee: MStar Semiconductor, Inc., Hsinchu Hsien (TW)

( * ) Notice: Subject to any disclaimer, the term of this patent is extended or adjusted under 35 U.S.C. 154(b) by 732 days.

(21) Appl. No.: 12/437,668

(22) Filed: May 8, 2009

(65) Prior Publication Data

US 2010/0165191 A1     Jul. 1, 2010

(30) Foreign Application Priority Data

Dec. 31, 2008    (TW) ................................ 97151862 A

(51) Int. Cl.
*H04N 7/01*     (2006.01)

(52) U.S. Cl. ........................................ 348/448; 348/458
(58) Field of Classification Search .................. None
See application file for complete search history.

(56) References Cited

FOREIGN PATENT DOCUMENTS

EP     0517385 A2 *   9/1992

* cited by examiner

*Primary Examiner* — Vivek Srivastava
*Assistant Examiner* — Rong Le
(74) *Attorney, Agent, or Firm* — Edell, Shapiro & Finnan, LLC

(57) ABSTRACT

A de-interlacing method and controller is provided. The de-interlacing method includes steps of de-interlacing based on an $i^{th}$ odd input pixel row of an odd field and an $i^{th}$ even input pixel row of an even field to generate an $i^{th}$ odd output pixel row, where i is a natural number; de-interlacing based on the $i^{th}$ even input pixel row and an $(i+1)^{th}$ odd input pixel row of the odd field to generate an $i^{th}$ even output pixel row; and adjusting i and repeating the above steps to generate a complete interpolated frame.

11 Claims, 14 Drawing Sheets

DE-INTERLACING METHOD AND CONTROLLER THEREOF

CROSS REFERENCE TO RELATED PATENT APPLICATION

This patent application is based on a Taiwan, R.O.C. patent application No. 097151862 filed on Dec. 31, 2008.

FIELD OF THE INVENTION

The present invention relates to a de-interlacing controller and method, and more particularly, to a double frame rate de-interlacing controller and method.

BACKGROUND OF THE INVENTION

Double frame rate liquid crystal display (LCD) televisions having a frame rate, or a frame frequency, e.g. 120 Hz, are now available to the market. Such LCD televisions operating at a frame rate of 120 Hz effectively overcomes the flicker issue of a conventional LCD television operating at a frame rate of 60 Hz. Using current techniques, upon receiving an input image, e.g. 60 Hz, a conventional double frame rate de-interfacing television duplicates each frame of the input image and places the same between each frame and a next frame to achieve the double frame rate, e.g. 120 Hz.

However, as the input image contains an object moving with a high speed, a residual image of the moving object is resulted in a display image due to the conventional double frame rate de-interlacing television consecutively playing two identical frames. In view of such issue, it is a vital task of the industry to provide a solution for improving the residual image of the display image of the conventional double frame rate de-interlacing television while also taking manufacturing costs into consideration.

SUMMARY OF THE INVENTION

Therefore, it is one object of the invention to provide a low-cost double frame rate de-interlacing controller and a method thereof for improving the residual image.

The present invention discloses a double frame rate de-interlacing method, comprising steps of generating a plurality of de-interlaced frames by performing an EODI operation based on an odd field and an even field that are temporally adjacent; and adaptively blending the de-interlaced frames with the odd field and the even field to generate a plurality of interpolated frames.

The present invention further discloses a double frame rate de-interlacing controller, for generating an output image in response to an input image, the input image comprising an odd field and an even field, the output image comprising a first interpolated frame, the de-interlacing controller comprising: a memory, a control circuit, a de-interlace engine and a blender. The memory receives and stors the odd field and the even field. The control circuit reads and outputs an $i^{th}$ odd input pixel row of the odd field, an $(i+1)^{th}$ odd input pixel row of the odd field and an $i^{th}$ even input pixel row of the even field. The de-interlace engine de-interlaces based on the $i^{th}$ odd input pixel row and the $i^{th}$ even input pixel row to generate a first pixel row, and performs the EODI operation based on the $(i+1)^{th}$ odd input pixel row and the $i^{th}$ even input pixel row to generate a second pixel row. The first and second pixel rows are assigned as an $i^{th}$ odd output pixel row and an $i^{th}$ even output pixel row of the first interpolated frame, respectively. The blender determines a first weight parameter and a second weight parameter for the first pixel row and the $i^{th}$ odd input pixel row, to generate the $i^{th}$ odd output pixel row of the first interpolated frame and determines a third weight parameter and a fourth weight parameter for the second pixel row and the $i^{th}$ even input pixel row, to generate the $i^{th}$ even output pixel row of the first interpolated frame.

The present invention further discloses a double frame rate de-interlacing method, for generating an output image in response to an input image, the input image comprising an odd field and an even field, the output image comprising a first interpolated frame, the de-interlacing method comprising steps of: generating an $i^{th}$ odd output pixel row of the first interpolated frame by performing an edge oriented de-interlacing (EODI) operation based on an $i^{th}$ odd input pixel row of the odd field and the $i^{th}$ even input pixel row of the even field, where i is a natural number; generating an $i^{th}$ even output pixel row of the first interpolated frame by performing the EODI operation based on the $i^{th}$ even input pixel row and an $(i+1)^{th}$ odd input pixel row of the odd field; and adjusting i and repeating the above steps to obtain all odd and even output pixel rows of the first interpolated frame.

BRIEF DESCRIPTION OF THE DRAWINGS

The present invention will become more readily apparent to those ordinarily skilled in the art after reviewing the following detailed description and accompanying drawings, in which.

DETAILED DESCRIPTION OF THE PREFERRED EMBODIMENT

In one embodiment, a de-interlacing method generates output images in response to input images. The input image comprises an odd field and an even field, and the output image comprises an interpolated frame. The de-interlacing method, at first, perform an edge oriented de-interlacing (EODI) operation based on an $i^{th}$ odd input pixel row of the odd field and an $i^{th}$ even input pixel row of the even field, an $i^{th}$ odd output pixel row of the interpolated frame is generated, where i is a natural number. Then, by performing an EDOI operation based on the $i^{th}$ even input pixel row of the even field and an $(i+1)^{th}$ odd input pixel row of the odd field, an $i^{th}$ even output pixel row is generated. The value of i is incremented and the above steps are repeated to obtain all odd and even output pixel rows of the interpolated frame.

Figure 1:
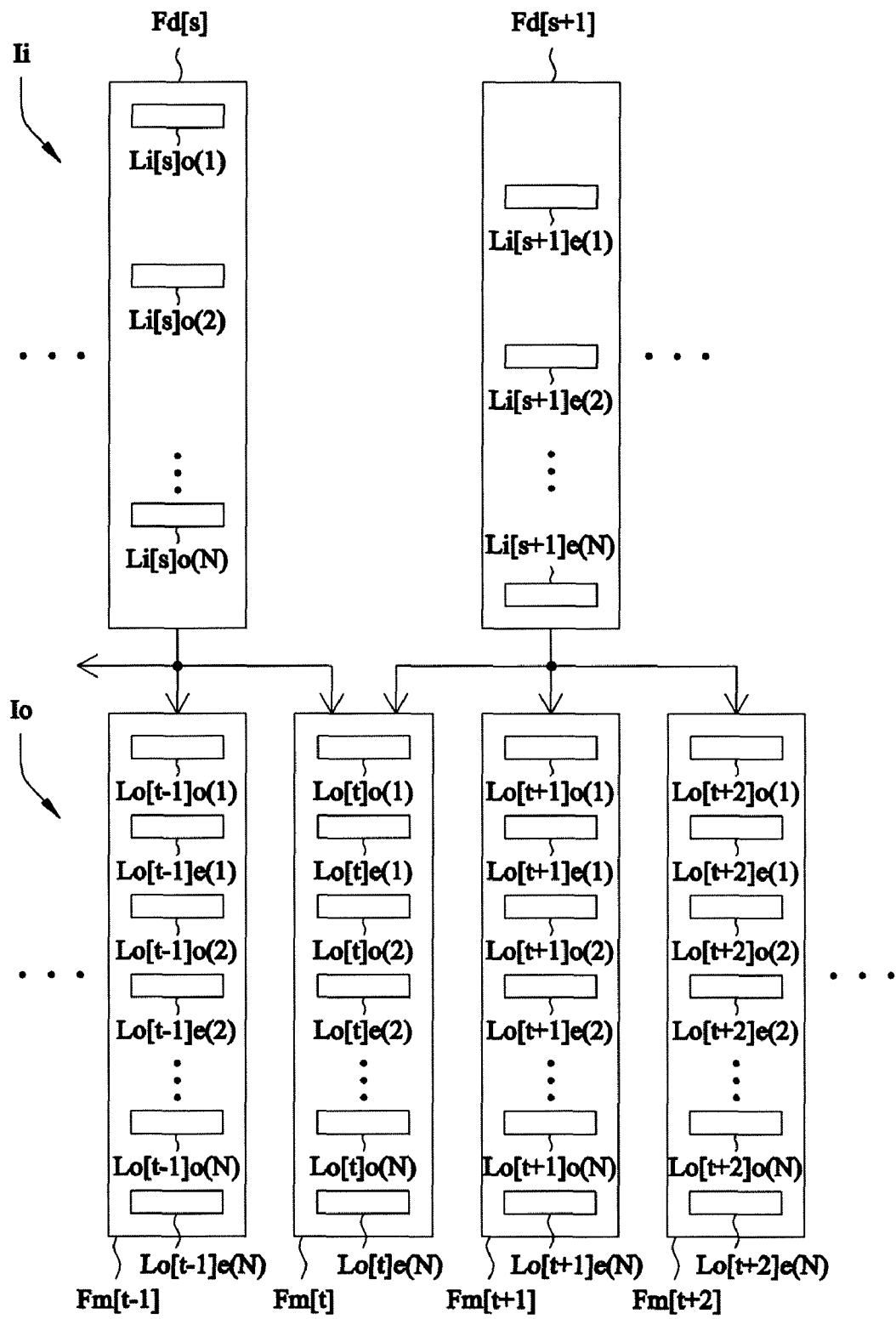
FIG. 1 is a schematic diagram of an input image and an output image of a de-interlacing controller according to one embodiment of the invention.

FIG. 1 shows a schematic diagram of an input image and an output image using the de-interlacing controller according to the embodiment. An input image Ii is an interlaced image. An odd field includes pixel data corresponding to odd scan lines, and an even field includes pixel data corresponding to even scan lines. In this embodiment, the de-interlacing controller performs double frame rate de-interlacing on the input image Ii to generate a progressive output image Io. In the following description, how the de-interlacing controller according to one embodiment generates frames Fm[t−1] to Fm[t+2] according to the fields corresponding to the input image Ii shall be discussed, wherein t is a natural number greater than 1.

In the first embodiment, the de-interlacing controller generates pixel data of the interpolated frames Fm[t−1] to Fm[t+2] by performing EODI based on pixel data of an odd field Fd[s] and an even field Fd[s+1]. FIG. 2E shows a block diagram of a de-interlacing controller according to the first embodiment of the invention. A de-interlacing controller 10 comprises a memory 12, a control circuit 14 and an EODI engine 16. The control circuit 14 is coupled to the memory 12, and the EODI engine 16 is coupled to the control circuit 14. For example, the memory 12 is a dynamic random access memory (DRAM), for storing pixel rows of a plurality of odd fields and even fields. For example, when performing operations for generating the frames Fm[t−1] to Fm[t+1], the memory 12 stores at least pixel rows of the odd field Fd[s] and the even field Fd[s+1]; when performing operations for generating the frame Fd[t+2], the memory 12 stores at least pixel rows of the even field Fd[s+1] and an odd field Fd[s+2].

The control circuit 14 reads pixel rows of the odd and even fields stored in the memory 12, and provides the same to the EODI engine 16 to generate interpolated frames. Operations of the EODI engine 16 for generating the interpolated frames Fm[t−1] to Fm[t+2] shall be discussed below. In the following section, $i^{th}$ odd pixel rows Lo[t−1]o(i), Lo[t]o(i), Lo[t+1]o(i) and Lo[t+2]o(i) of the frames Fm[t−1] to Fm[t+2] shall be used for illustrating operations of the odd pixel rows of the frames Fm[t−1] to Fm[t+2], respectively; $i^{th}$ even pixel rows Lo[t−1]e(i), Lo[t]e(i), Lo[t+1]e(i) and Lo[t+2]e(i) of the frames Fm[t−1] to Fm[t+2] shall be used for illustrating operations of the even pixel rows of the frames Fm[t−1] to Fm[t+2], respectively; where i is a natural number smaller than or equal to N.

Figure 2A:
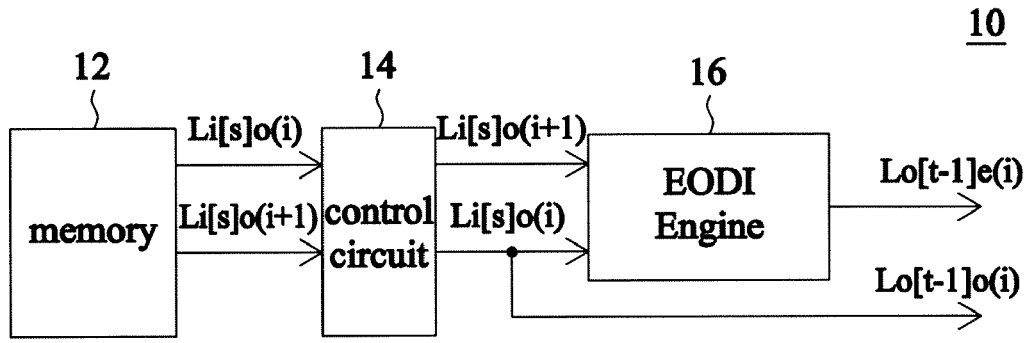
FIGS. 2A to 2E are block diagrams of a double frame rate de-interlacing controller according to a first embodiment of the invention.
Figure 3A:
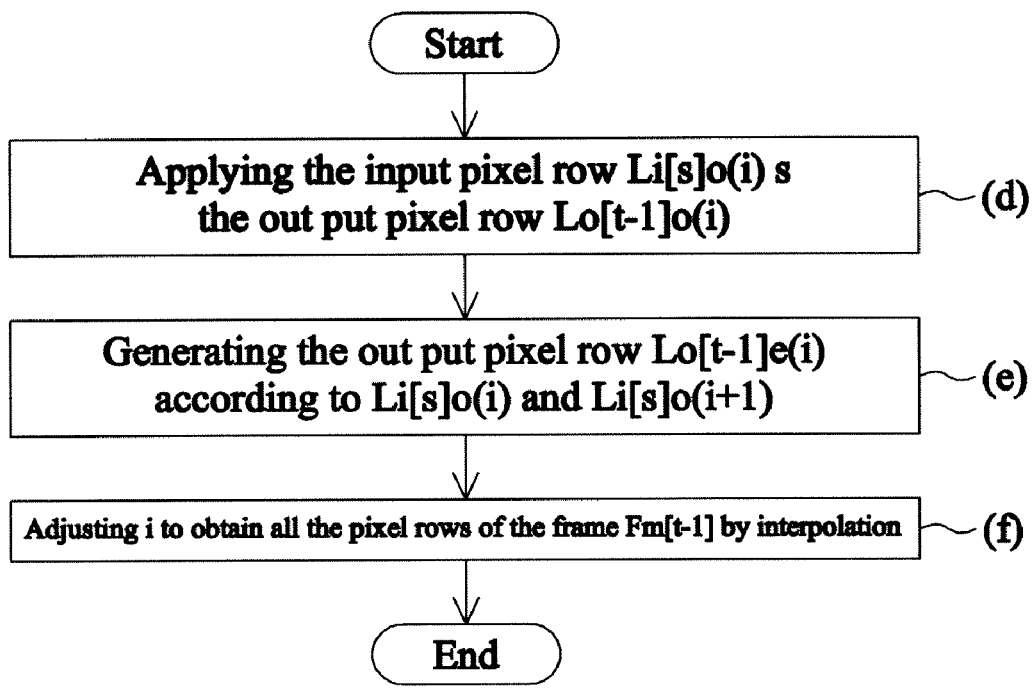
FIG. 3A is a partial flowchart of a double frame rate de-interlacing operation method according to the first embodiment of the invention.

Referring to FIGS. 3A, 2A and 1, during the interpolation operation for generating the frame Fm[t−1], the control circuit 14 accesses the memory 12 to obtain input pixel rows Li[s]o(1) to Li[s]o(N) of the odd field Fd[s], where N is a natural number greater than 1. FIG. 3A shows a partial flowchart of the de-interlacing method according to the first embodiment. In FIG. 2A, only the input pixel rows Li[s]o(i) and Li[s]o(i+1) are depicted for illustration. In Step (d), the control circuit 14 applies the input pixel row Li[s]o(i) as the output pixel row Lo[t−1]o(i). In Step (e), the control circuit 14 provides the input pixel rows Li[s]o(i) and Li[s]o(i+1) to the EODI engine 16, which then generates the output pixel row Lo[t−1]e(i) of the frame Fm[t−1]. In Step (f), the de-interlacing controller 10 adjusts i to obtain all the pixel rows of the frame Fm[t−1] by interpolation.

Figure 2B:
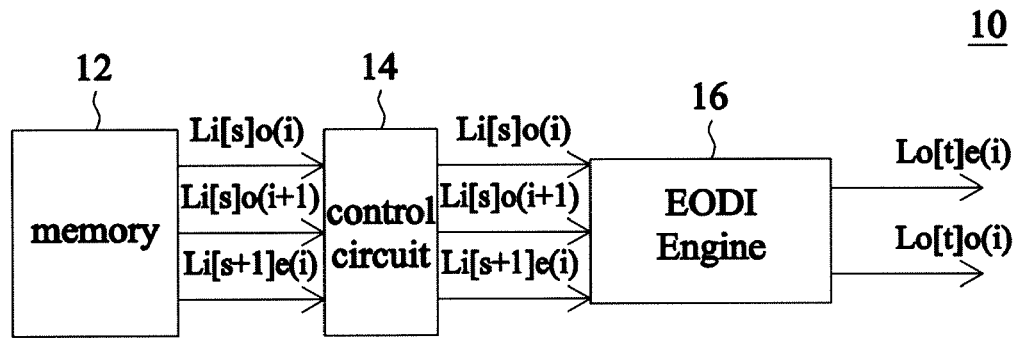
Figure 3B:
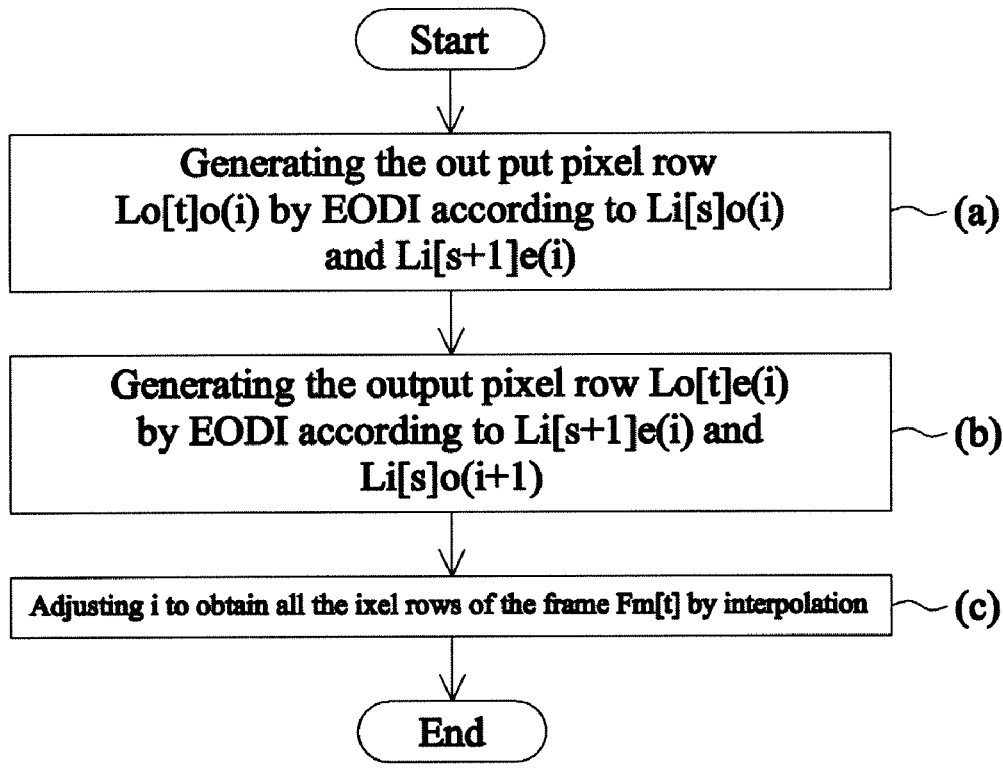
FIG. 3B is a partial flowchart of a double frame rate de-interlacing operation method according to the first embodiment of the invention.

With reference to FIGS. 3B, 2B and 1, during the interpolation operation for generating the frame Fm[t], the control circuit 14 accesses the memory 12 to obtain input pixel rows Li[s]o(1) to Li[s]o(N) of the odd field Fd[s], and the input pixel rows Li[s+1]e(1) to Li[s+1]e(N) of the even field Fd[s+1]. FIG. 3B shows a partial flowchart of the de-interlacing method according to this embodiment. In FIG. 2B, only the input pixel rows Li[s]o(i), Li[s]o(i+1) and Li[s+1]e(i) are depicted for illustration. In Step (a), the control circuit 14 provides the input pixel rows Li[s]o(i) and Li[s+1]e(i) to the EODI engine 16, which then generates the output pixel row Lo[t]o(i) of the frame Fm[t]. In Step (b), the control circuit 14 further provides the input pixel row Li[s+1]e(i) and Li[s]o(i+1) to the EODI engine 16, which then generates the output pixel row Lo[t]e(i) of the frame Fm[t]. In Step (c), the de-interlacing controller 10 adjusts i to obtain all the pixel rows of the frame Fm[t] by interpolation.

Figure 2C:
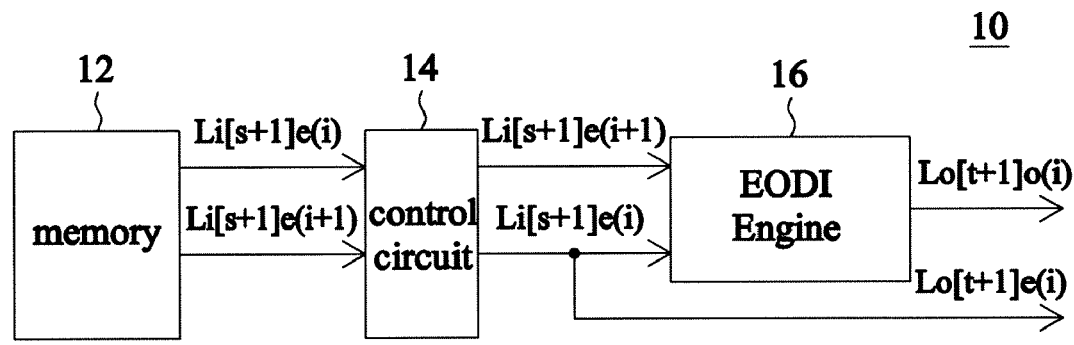
Figure 3C:
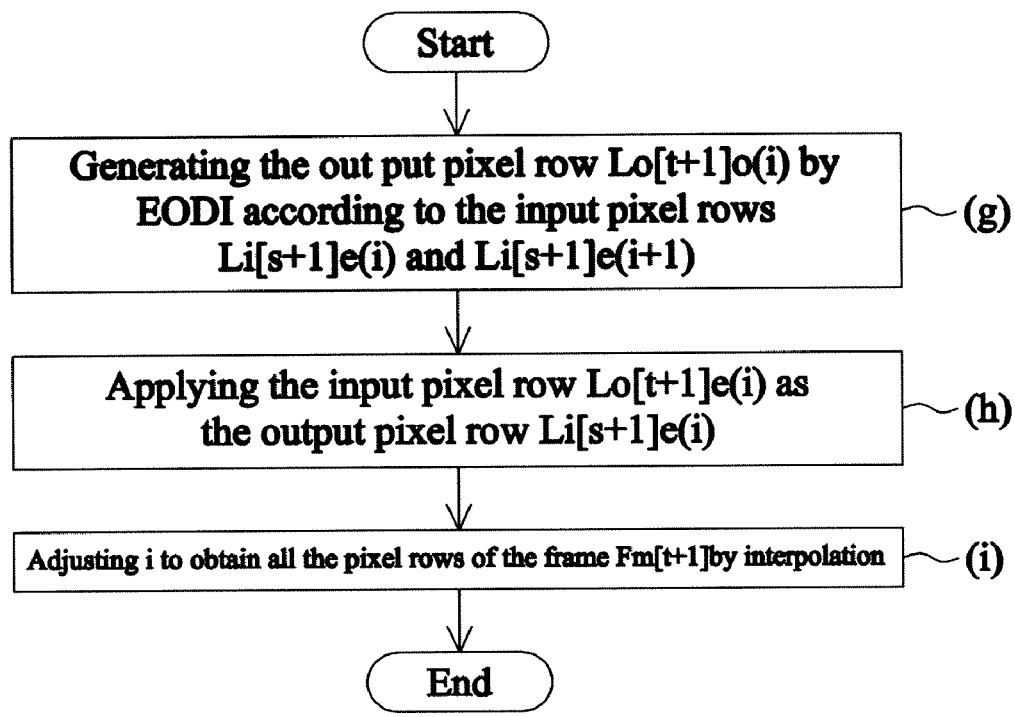
FIG. 3C is a partial flowchart of a double frame rate de-interlacing operation method according to the first embodiment of the invention.

With reference to FIGS. 3C, 2C and 1, during the interpolation operation for generating the frame Fm[t+1], the control circuit 14 accesses the memory 12 to obtain the input pixel rows Li[s+1]e(1) to Li[s+1]e(N) of the even field Fd[s+1]. FIG. 3C shows a partial flowchart of the de-interlacing method according to this embodiment. In FIG. 2C, only the input pixel rows Li[s+1]e(i) and Li[s+1]e(i+1) are depicted for illustration. In Step (g), the control circuit 14 provides the input pixel rows Li[s+1]e(i) and Li[s+1]e(i+1) to the EODI engine 16, which then generates the output pixel row Lo[t+1]o(i) of the frame Fm[t+1]. In Step (h), the control circuit 14 applies the input pixel row Li[s+1]e(i) as the output pixel row Lo[t+1]e(i). In Step (i), the de-interlacing controller 10 adjusts i to obtain all the pixel rows of the frame Fm[t+1] by interpolation.

Figure 2D:
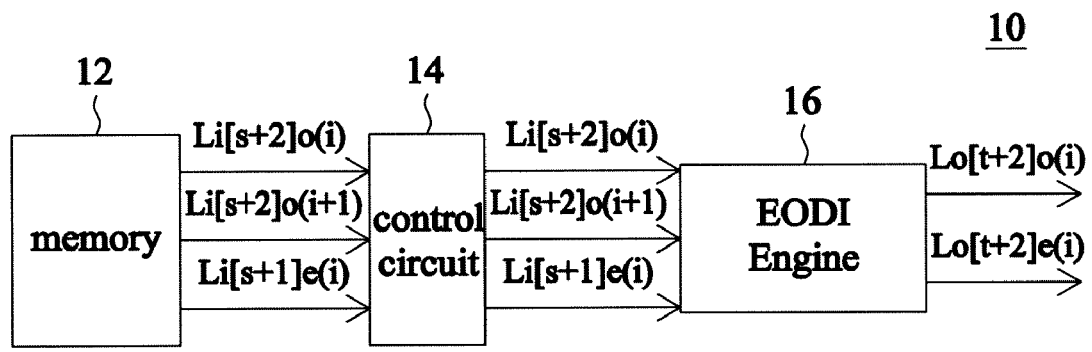
Figure 2E:
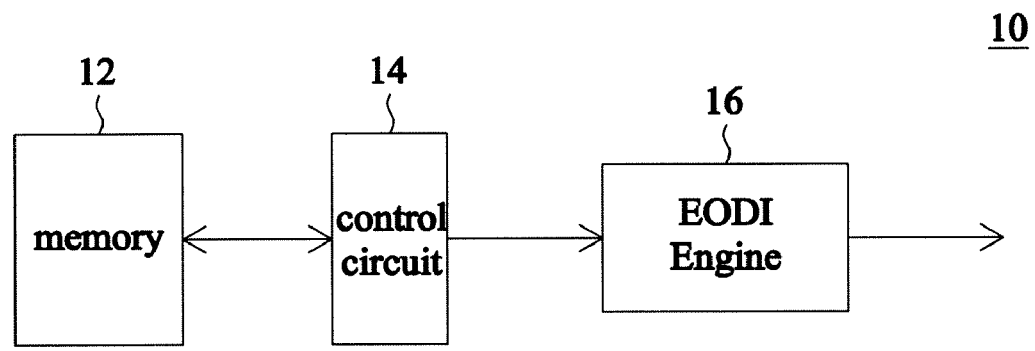
Figure 3D:
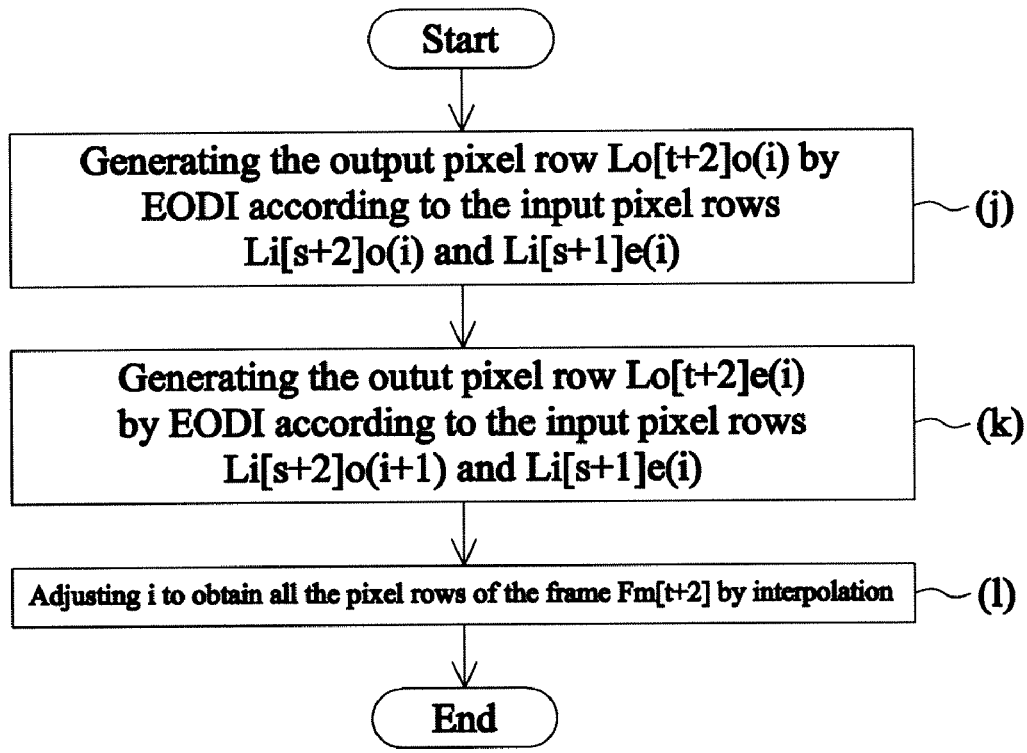
FIG. 3D is a partial flowchart of a double frame rate de-interlacing operation method according to the first embodiment of the invention.

With reference to FIGS. 3D, 2D and 1, during the interpolation operation for generating the frame Fm[t+2], the control circuit 14 accesses the memory 12 to obtain the input pixel rows Li[s+1]e(1) to Li[s+1]e(N) of the even field Fd[s+1], and the input pixel rows Li[s+2]o(1) to Li[s+2]o(N) of the odd field Fd[s+2] (not shown). FIG. 3D shows a partial flowchart of the de-interlacing method according to this embodiment. In FIG. 2D, only the input pixel rows Li[s+2]o(i), Li[s+2]o(i+1) and Li[s+1]e(i) are depicted for illustration. In Step (j), the control circuit 14 provides the input pixel rows Li[s+2]o(i) and Li[s+1]e(i) to the EODI engine 16, which then generates the output pixel row Lo[t+2]o(i) of the frame Fm[t+2]. In Step (k), the control circuit 14 provides the input pixel rows Li[s+2]o(i+1) and Li[s+1]e(i) to the EODI engine 16, which then generates the output pixel row Lo[t+2]e(i) of the frame Fm[t+2]. In Step (l), the de-interlacing controller 10 adjusts i to obtain all the pixel rows of the frame Fm[t+2] by interpolation.

Figure 4:
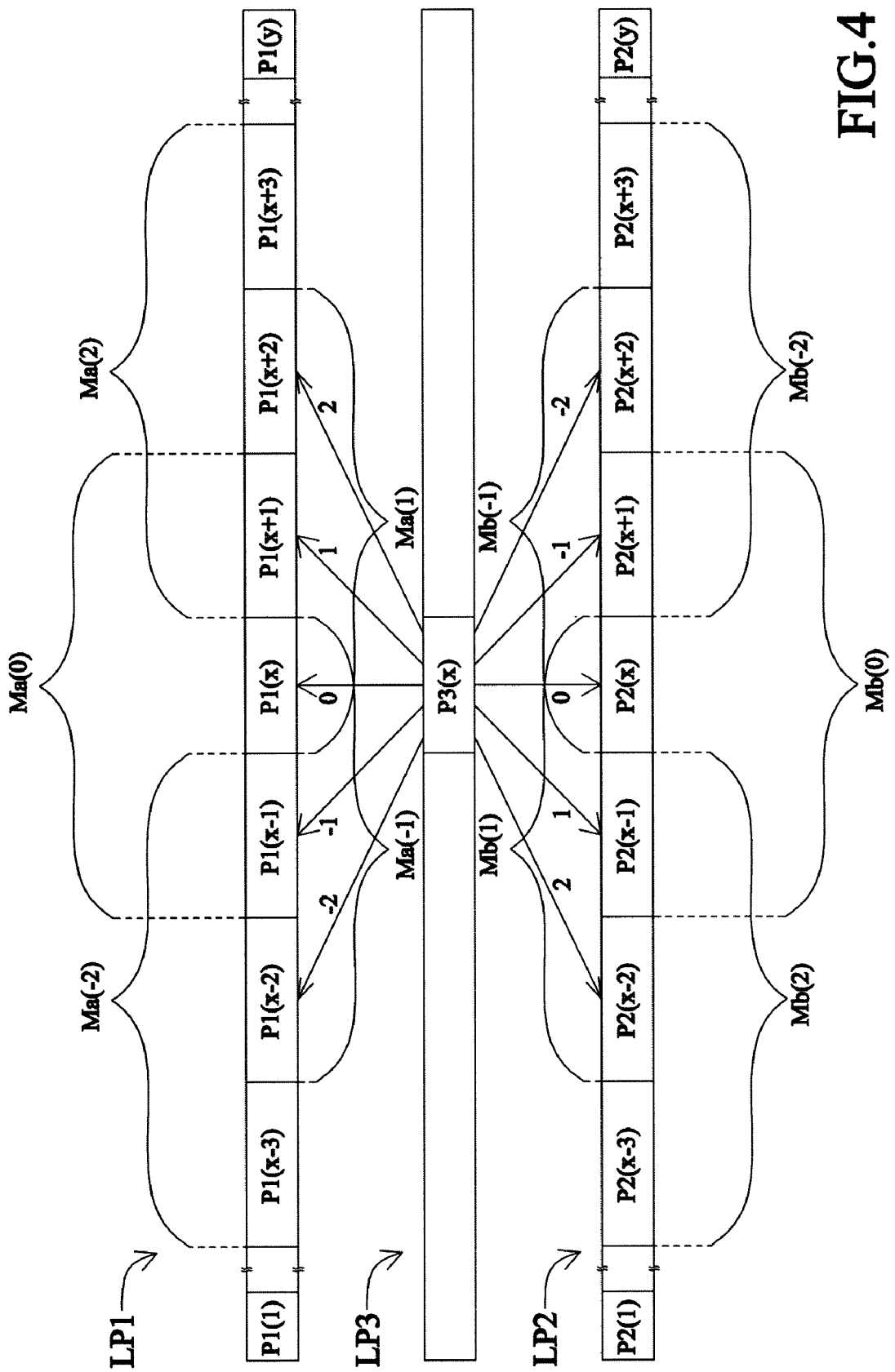
FIG. 4 is a schematic diagram illustrating operations of an EODI engine according to the first embodiment of the invention.

FIG. 4 shows a schematic diagram illustrating operations of an EODI engine 16 according to one preferred embodiment of the invention. The EODI engine 16 receives pixel rows LP1 and LP2 to accordingly generate an interpolated pixel row LP3, which includes pixel data P3(1) to P3(y). How the EODI engine 16 generates each of the pixel data P3(1) to P3(y) is substantially the same. Operations of the EODI engine 16 for generating the interpolated pixel data P3(x) shall be discussed below, where y is a natural number greater than 1, and x is a natural number smaller or equal to y.

An EODI operation comprises the following steps. According to a plurality of direction indices, a plurality of pixel data of the pixel row LP1 are mapped to a plurality of pixel data of the pixel row LP2. For example, a direction index D includes $\{-1, -1, 0, 1, 2\}$, according to which pixel data P1(x+2) to P1(x−2) of the pixel row LP1 are mapped to pixel data P2(x−2) to P3(x+2) of the pixel row LP2, respectively.

Next, the pixel data P1(x−2) to P1(x+2) mapped by the direction index D including values from −2 to 2, is centrally divided into corresponding large blocks Ma(−2) to Ma(2). Pixel data P2(x−2) to P2(x+2) mapped by the direction index D including values from −2 to 2, is centrally divided into corresponding large blocks Mb(−2) to Mb(2). For example, each of the large blocks Ma(−2) to Ma(2), and Mb(−2) to Mb(2) includes three horizontal pixels. Block matching is then performed on corresponding large blocks, e.g., Ma(D) and Mb(D), to obtain a corresponding block difference Diff (D), where D is −2 to 2. For example, a block difference Diff(−2) is obtained through the equation below:

$$Diff(-2)=|P1(x-1)-P2(x+1)|+|P1(x-2)-P2(x+2)|+|P1(x-3)-P2(x+3)|$$

For example, a smallest block difference corresponding to the direction index D is determined as a detection direction. Being a smallest block difference among the block differences Diff(−2) to Diff(2), the block difference Diff(−2) is determined as the detection direction. Interpolation is then performed based on the pixel data P1(x−2) and P2(x+2) corresponding to the detection direction to obtain pixel data P3(x).

In the foregoing embodiment, operations of the de-interlacing controller 10 for generating the frames Fm[t−1] to Fm[t+1] based on the odd field Fd[s] and the even field Fd[s+1], and the frame Fm[t+2] based on the odd field Fd[s+2] and the even field Fd[s+1] are illustrated as an example. To those skilled in the related art, it can be understood how all frames are generated.

The de-interlacing controller 10 according to this embodiment generates four interpolated frames based on the odd and even fields utilizing the EODI engine. Therefore, compared to a conventional de-interlacing system that directly displays two identical first frames as double frame rate display, the de-interlacing controller according to this embodiment effectively overcomes the issue of residual image.

Figure 5A:
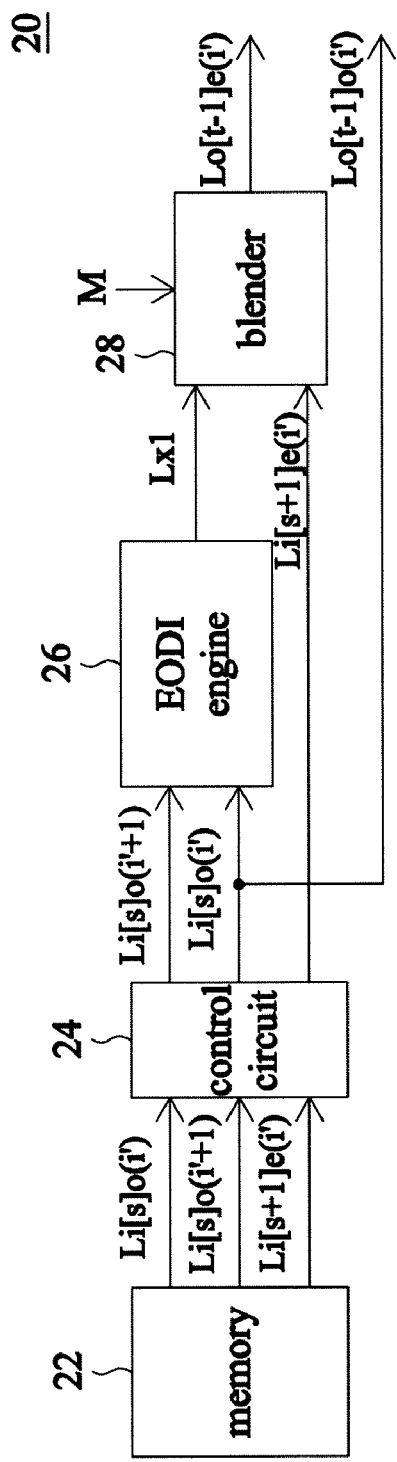
FIGS. 5A to 5E are block diagrams of a double frame rate de-interlacing controller according to a second embodiment of the invention.
Figure 5B:
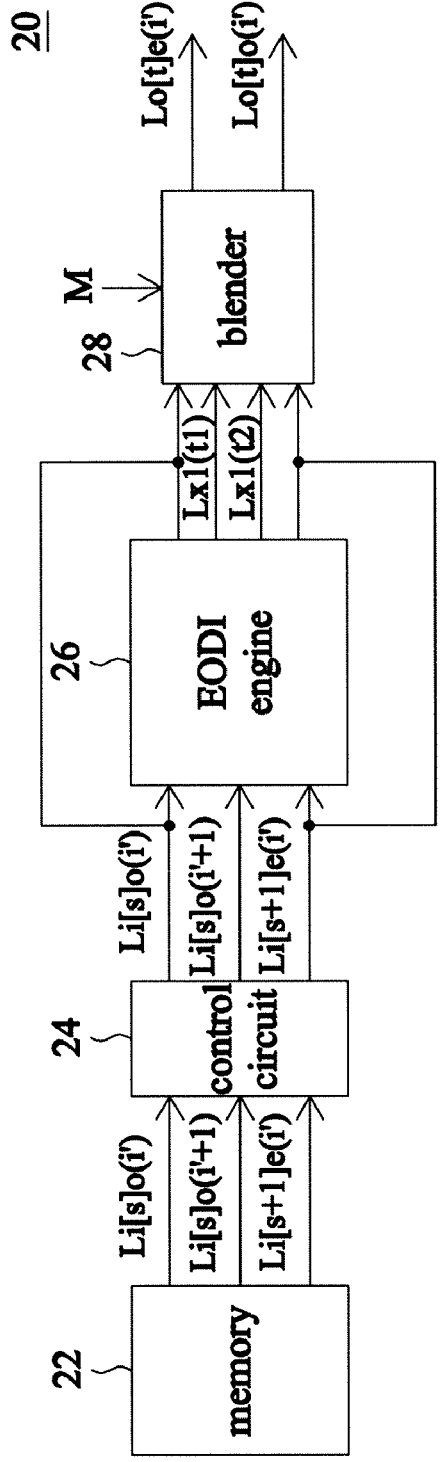
Figure 5C:
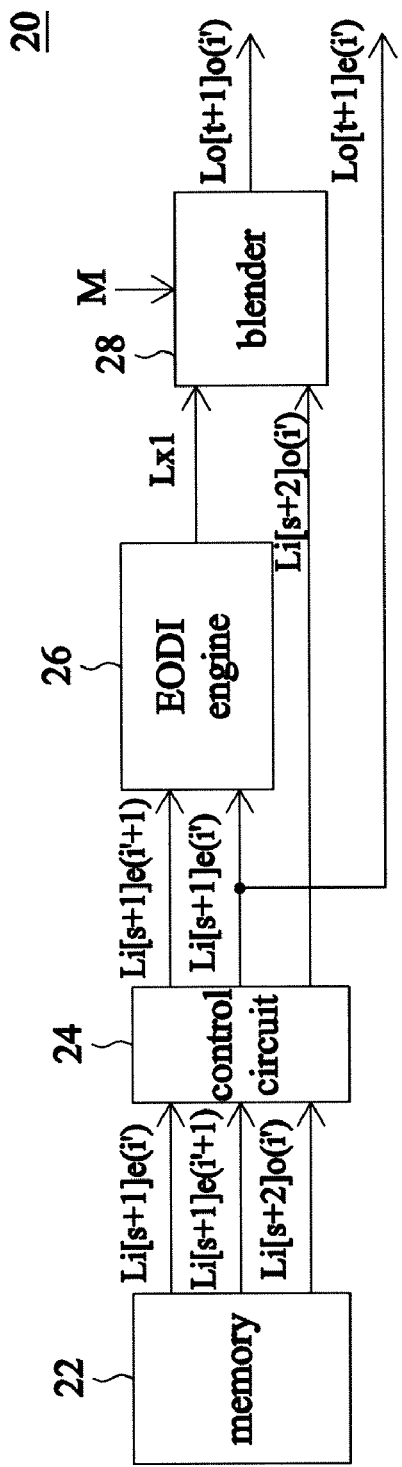
Figure 5D:
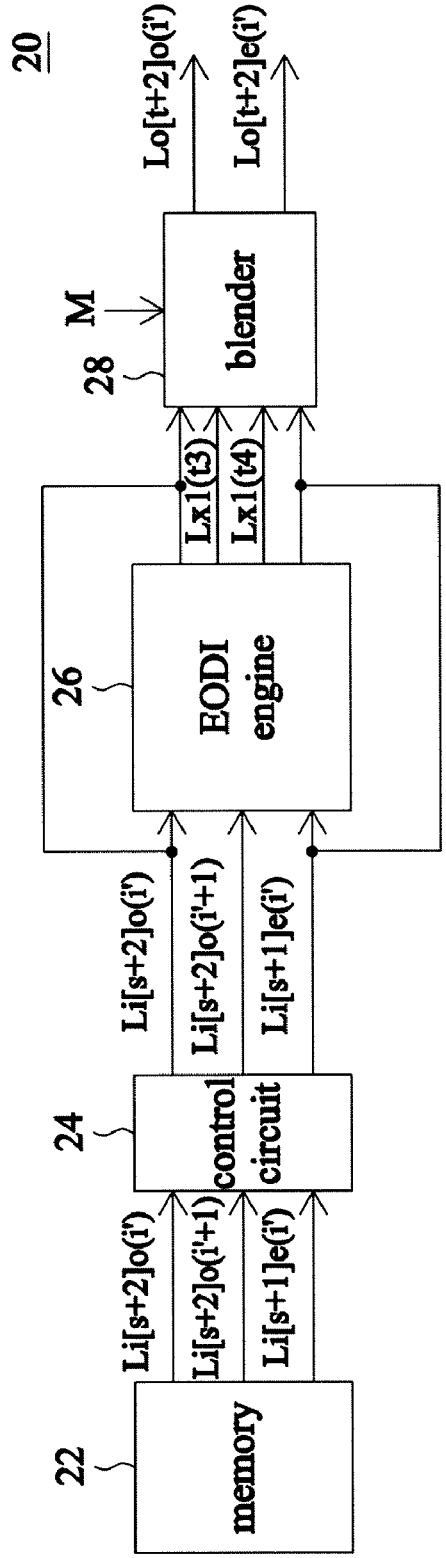
Figure 5E:
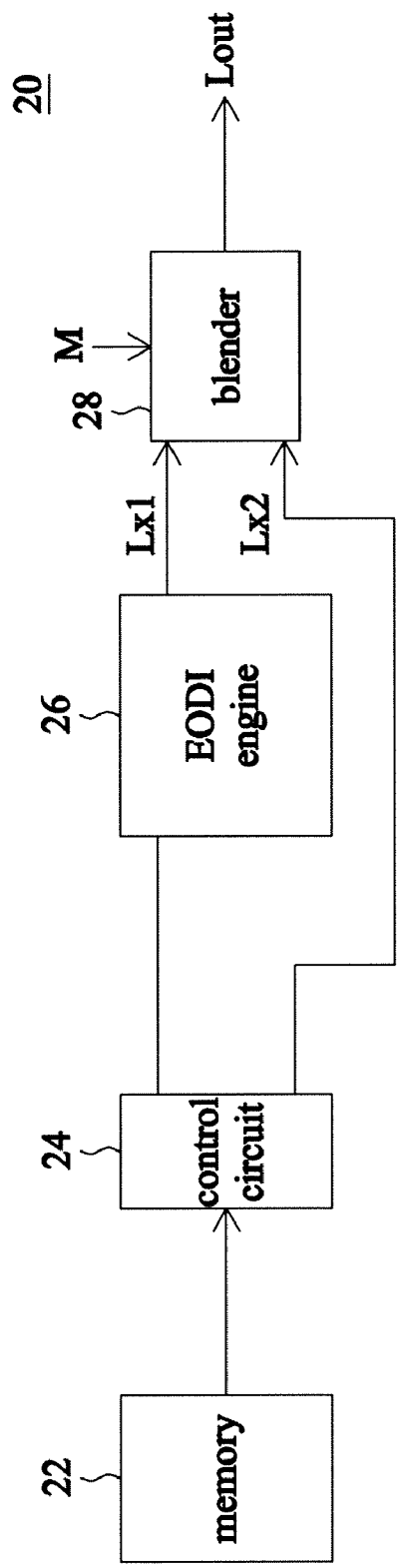

FIG. 5E shows a block diagram of the de-interlacing controller 20 according to the second embodiment of the invention. The de-interlacing controller 20 according to the second embodiment utilizes an EODI engine as well as a blender, by double frame rate interpolation, to obtain image data of the frames Fm[t−1] to Fm[t+2] with reference to image motion of the input image Ii.

One main difference between a de-interlacing controller 20 according to the second embodiment and the de-interlacing controller 10 according to the first embodiment lies in a memory control circuit 24 and a blender 28 according to the second embodiment. The blender 28, coupled to an EODI engine 26 and a control circuit 24, references an image motion factor M of the input image Ii, and generates an interpolated output pixel row Lout based on a pixel row generated by the EODI engine 26 and an input pixel row Lx2 provided by the control circuit 24.

Figure 6:
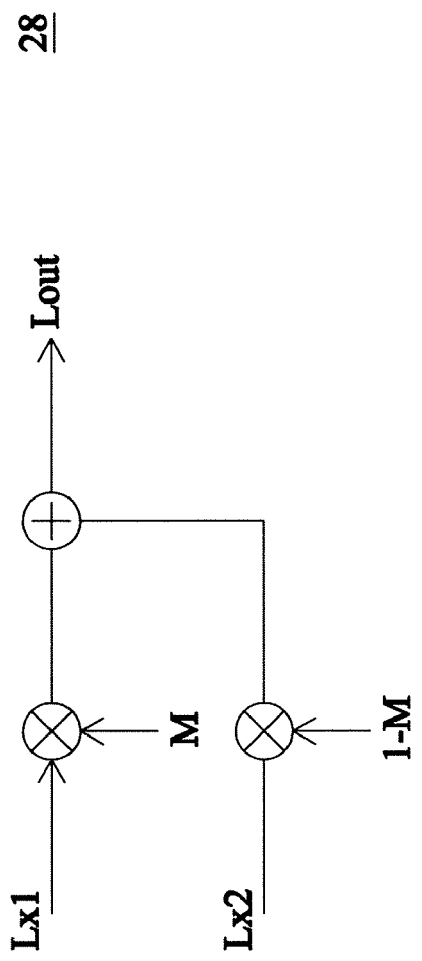
FIG. 6 is a block diagram of a blender according to the second embodiment of the invention.

FIG. 6 shows a block diagram of the blender 28. The blender 28 determines weights of the pixel rows Lx1 and Lx2 according to the motion factor M, and blends the same to generate an output pixel row Lout. For example, the blender 28 blends to generate an output pixel row Lout according to the following equation:

$$Lout=Lx1xM+Lx2x(1-M)$$

Detailed descriptions on operations of the de-interlacing controller 20 for generating the interpolated frames Fm[t−1] to Fm[t+2] shall be given below. In the following section, $i'^{th}$ odd pixel rows Lo[t−1]o(i)', Lo[t]o(i'), Lo[t+1]o(i') and Lo[t+2]o(i') of the frames Fm[t−1] to Fm[t+2], respectively, shall be used for illustrating operations of the odd pixel rows of the frames Fm[t−1] to Fm[t+2], respectively. $I'^{th}$ even pixel rows Lo[t−1]e(i'), Lo[t]e(i'), Lo[t+1]e(i') and Lo[t+2]e(i') of the frames Fm[t−1] to Fm[t+2], respectively, shall be used for illustrating operations of the even pixel rows of the frames Fm[t−1] to Fm[t+2], respectively; where i' is a natural number smaller than or equal to N.

Figure 7A:
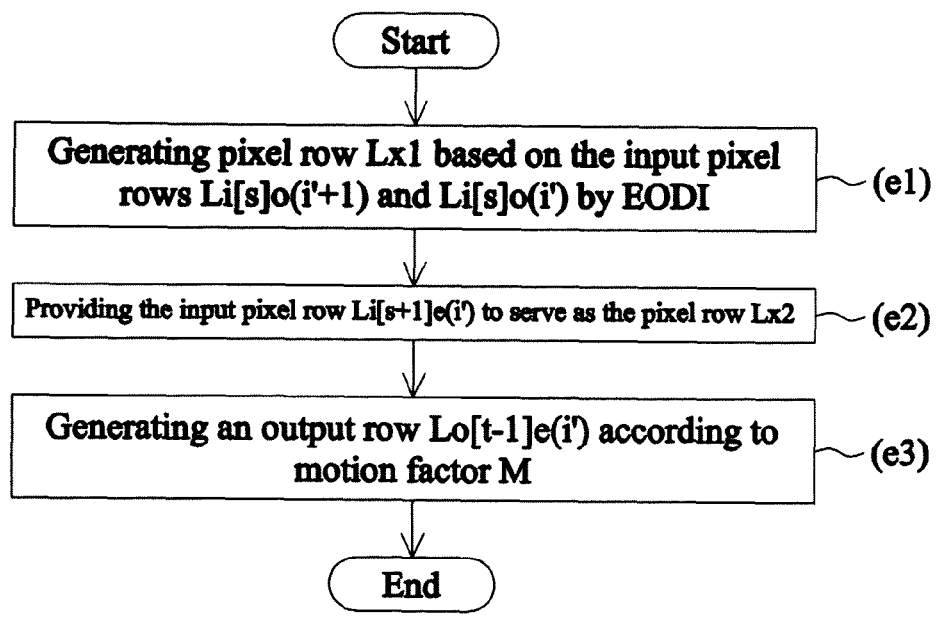
FIG. 7A is a partial flowchart of a double frame rate de-interlacing operation method according to the second embodiment of the invention.
Figure 7B:
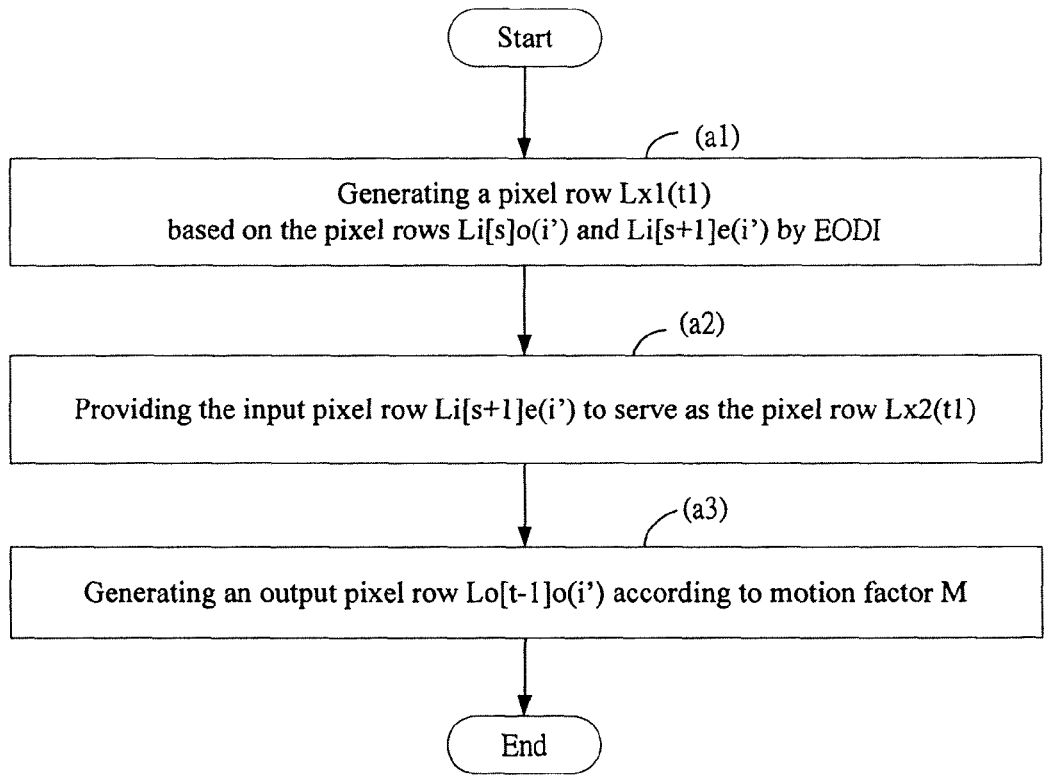
FIG. 7B is a partial flowchart of a double frame rate de-interlacing operation method according to the second embodiment of the invention.
Figure 7C:
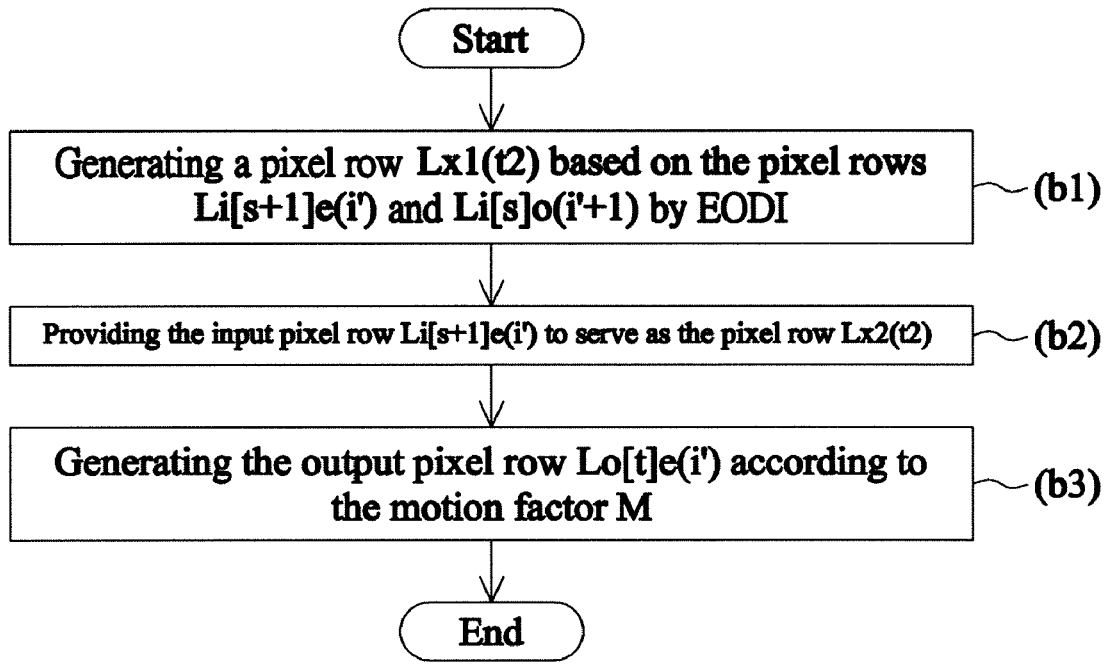
FIG. 7C is a partial flowchart of a double frame rate de-interlacing operation method according to the second embodiment of the invention.

Referring to FIGS. 7A, 5A and 1, a de-interlacing method according to the second embodiment differs from the embodiment shown in FIG. 3A that Step (e) comprises Steps (e1) to (e3). In Step (e1), the EODI engine 26 generates the pixel row Lx1 based on the input pixel rows Li[s]o(i'+1) and Li[s]o(i'). Operations of the EODI engine 26 based on input data are identical to those of the EODI engine 16, and shall not be unnecessarily further described. In Step (e2), the control circuit 24 accesses the input pixel row Li[s+1]e(i') stored in the memory 22 to serve as the pixel row Lx2 to the blender 28.

In Step (e3), according to motion factors M and (1−M), the blender 28 determines weights of the pixel rows Lx1 and Lx2, respectively, and blends the same to generate an output pixel row Lout. The output pixel row Lout is outputted as the output pixel row Lo[t−1]e(i') of the frame Fm[t−1].

With reference to FIGS. 7B, 7C, 5B and 1, the de-interlacing method according to the second embodiment differs from the embodiment in FIG. 3B that Step (a) comprises Steps (a1) to (a3), and Step (b) comprises Steps (b1) to (b3). In Step (a1), the EODI engine 26 generates a pixel row Lx1(t1) based on the pixel rows Li[s]o(i') and Li[s+1]e(i'). In Step (a2), the control circuit 24 provides the input pixel row Li[s]o(i') as a pixel row Lx2(t1) to the blender 28. In Step (a3), according to the motion factor M, the pixel rows Lx1(t1) and Lx2(t1), a pixel row Lout is generated and outputted as the output pixel row Lo[t]o(i').

In Step (b1), the EODI engine 26 generates a pixel row Lx1(t2) based on the pixel rows Li[s+1]e(i') and Li[s]o(i'+1). In Step (b2), the control circuit 24 provides the input pixel row Li[s+1]e(i') as a pixel row Lx2(t2) to the blender 28. In Step (b3), according to the motion factor M, the pixel rows Lx1(t2) and Lx2(t2), a pixel row Lout is generated and outputted as the output pixel row Lo[t]e(i').

Figure 7D:
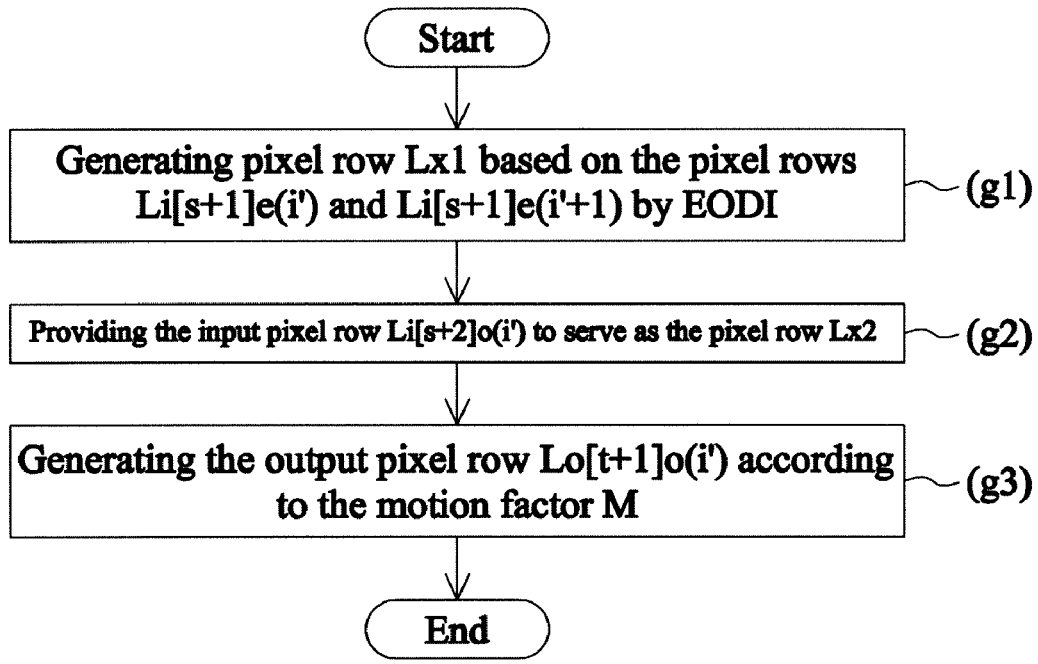
FIG. 7D is a partial flowchart of a double frame rate de-interlacing operation method according to the second embodiment of the invention.
Figure 7E:
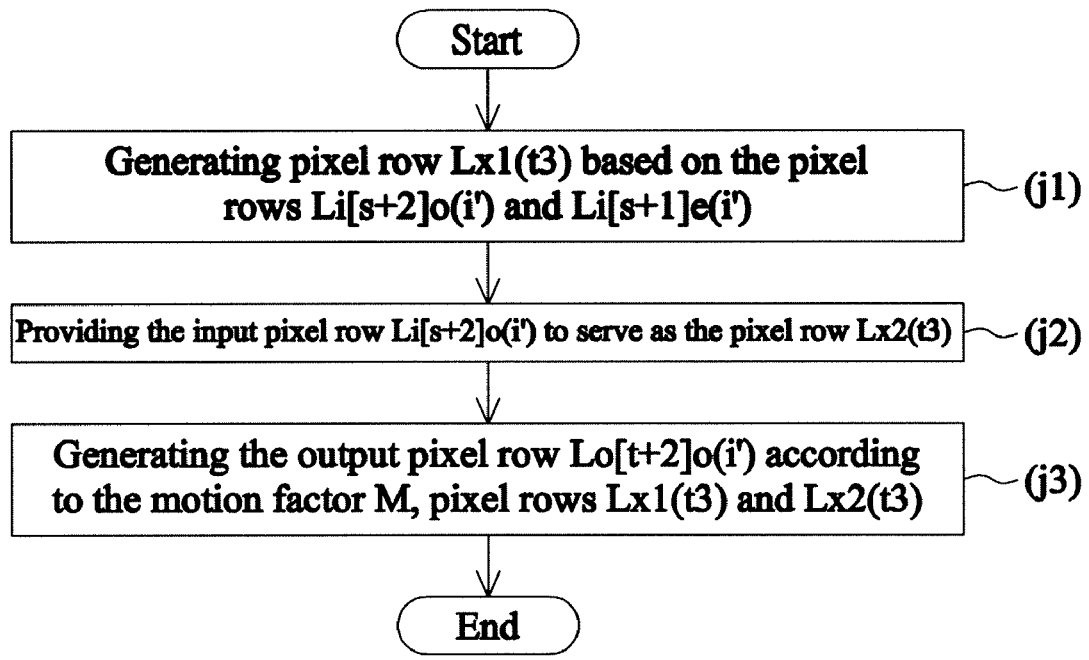
FIG. 7E is a partial flowchart of a double frame rate de-interlacing operation method according to the second embodiment of the invention.
Figure 7F:
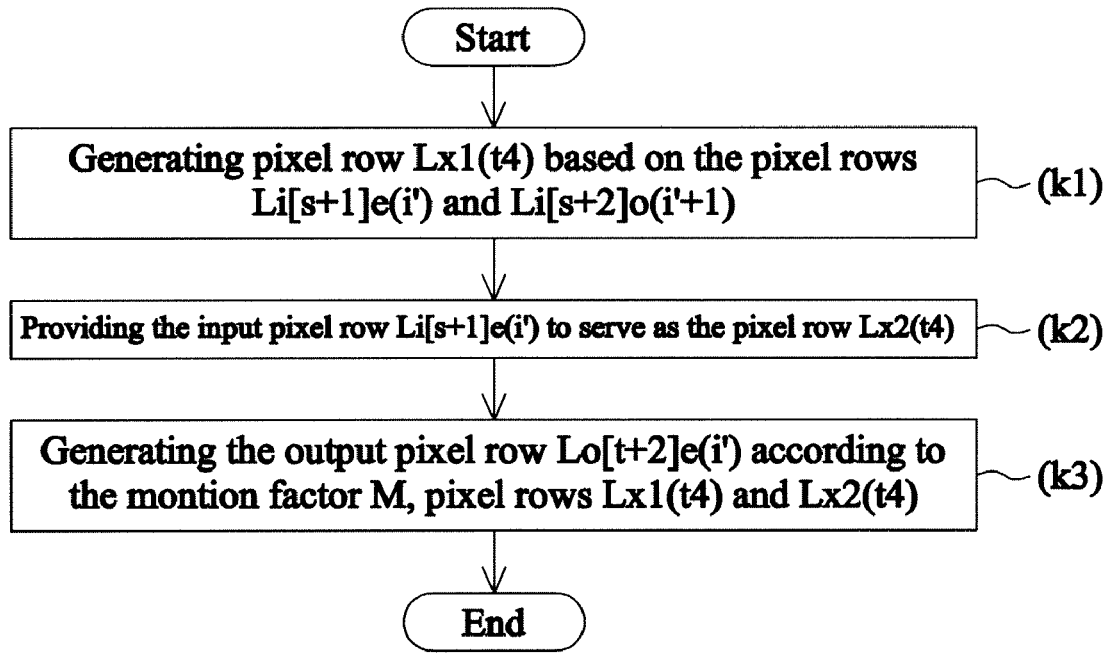
FIG. 7F is a partial flowchart of a double frame rate de-interlacing operation method according to the second embodiment of the invention.

With reference to FIGS. 7D, 5C, and 1, the de-interlacing method according to the second embodiment differs from the embodiment in FIG. 3C that Step (g) comprises Steps (g1) to (g3). In Step (g1), the EODI engine 26 generates the pixel row Lx1 based on the pixel rows Li[s+1]e(i') and Li[s+1]e(i'+1). In Step (g2), the control circuit 24 provides the input pixel row Li[s+2]o(i') as the pixel row Lx2 to the blender 28. In Step (g3), according to the motion factor M, the pixel rows Lx1 and Lx2, a pixel row Lout is generated and outputted as the output pixel row Lo[t+1]o(i').

With reference to FIGS. 7E, 7F, 5D and 1, the de-interlacing method according to the second embodiment differs from the embodiment in FIG. 3D that Step (j) comprises Steps (j1) to (j3), and Step (k) comprises Steps (k1) to (k3). In Step (1), the EODI engine 26 generates a pixel row Lx1(t3) based on the pixel rows Li[s+2]o(i') and Li[s+1]e(i'). In Step (j2), the control circuit 24 provides the input pixel row Li[s+2]o(i') as a pixel row Lx2(t3) to the blender 28. In Step (j3), according to the motion factor M, the pixel rows Lx1(t3) and Lx2(t3), a pixel row Lout is generated and outputted as the output pixel row Lo[t+2]o(i').

In Step (k1), the EODI engine 26 generates a pixel row Lx1(t4) based on the pixel rows Li[s+1]e(i') and Li[s+2]o(i'+1). In Step (k2), the control circuit 24 provides the input pixel row Li[s+1]e(i') as a pixel row Lx2(t4) to the blender 28. In Step (k3), according to the motion factor M, the pixel rows Lx1(t4) and Lx2(t4), a pixel row Lout is generated and outputted as the output pixel row Lo[t+2]e(i').

The de-interlacing controller 20 according to the second embodiment of the invention may utilize a motion estimation circuit (not shown) to generate the motion factor M. For each of the pixel data generated by the blender 28, corresponding to the output image Io, the motion estimation circuit correspondingly generates the motion factor M. For example, the motion estimation circuit determines a motion estimation region and, from an $x^{th}$ pixel row of the frame Fm[t−1], estimates a $y^{th}$ pixel data P[t]o(x,y) corresponding to a motion factor M[t]o(x,y), where x is a natural number smaller than or equal to N. Further, in the foregoing odd and even fields, each pixel row includes Z pixel data, and y is a natural number smaller than or equal to Z.

Figure 8A:
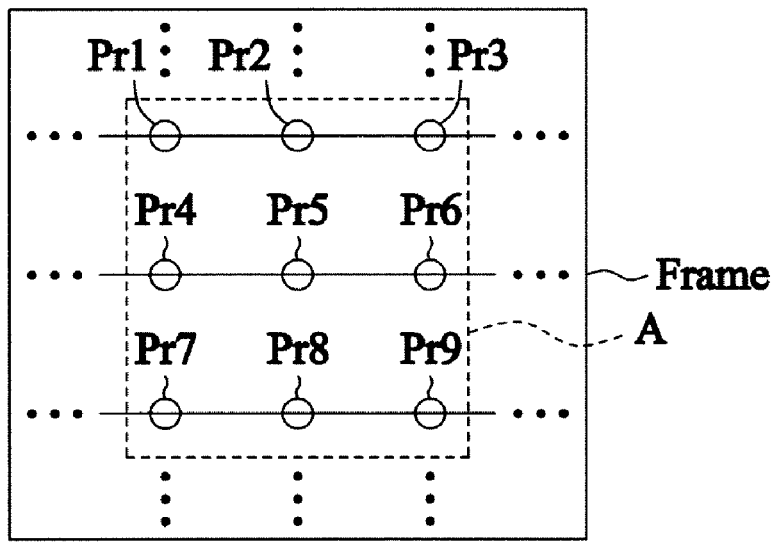
FIG. 8A is a schematic diagram of an interpolated frame "Frame" according to the second embodiment of the invention.
Figure 8B:
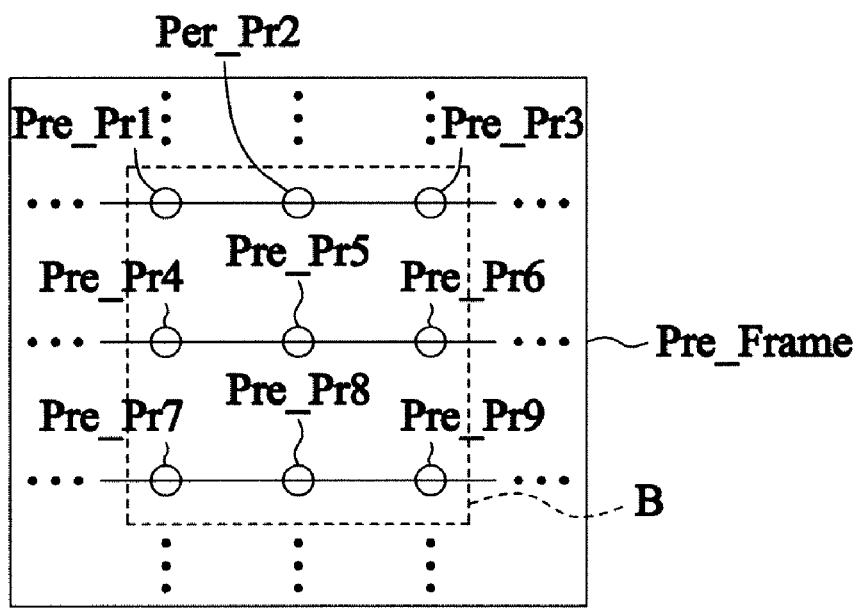
FIG. 8B is a schematic diagram of an interpolated frame "Pre-Frame" according to the second embodiment of the invention.

Refer to FIGS. 8A and 8B showing schematic diagram of motion estimation operations of the motion estimation circuit according to this embodiment. The motion estimation circuit synthesizes a frame Frame from an odd field Fd[s] and an even field Fd[s+1], and synthesizes a frame Pre_Frame from an odd field Fd[s−2] and an even field Fd[s−1].

The motion estimation circuit then defines an area A in the frame Frame. For example, the region A includes pixel data Pr1 to Pr9. Wherein, the pixel data Pr1 to Pr3 are pixel data P[s+1]e(x,y−1), P[s+1]e(x,y) and P[s+1]e(x,y+1) of an input pixel row Li[s+1]e(x) of the even field Fd[s+1]. The pixel data Pr4 to Pr6 are pixel data P[s]o(x,y−1), P[s]o(x,y) and P[s]o(x,y+1) of an input pixel row Li[s]o(x) of the odd field Fd[s]. The pixel data Pr7 to Pr9 are pixel data P[s+1]e(x+1,y−1), P[s+1]e(x+1,y) and P[s+1]e(x+1,y+1) of an input pixel row Li[s+1]e(x+1) of the even field Fd[s+1].

Similarly, the estimation circuit defines an area B in the frame Pre_Frame. The region B includes pixel data Pre_Pr1 to Pre_Pr9. The pixel data Pre_Pr1 to Pre_Pr3 are pixel data P[s−1]e(x,y−1), P[s−1]e(x,y) and P[s−1]e(x,y+1) of an input pixel row Li[s−1]e(x) of the even field Fd[s−1]. The pixel data Pre_Pr4 to Pre_Pr6 are pixel data P[s−2]o(x,y−1), P[s−2]o(x,y) and P[s−2]o(x,y+1) of an input pixel row Li[s−2]o(x) of the odd field Fd[s−2]. The pixel data Pre_Pr7 to Pre_Pr9 are pixel data P[s−1]e(x+1,y−1), P[s−1]e(x+1,y) and P[s−1]e(x+1,y+1) of an input pixel row Li[s−1]e(x+1) of the even field Fd[s−1].

The following equation may be applied to generate the motion factor M[t]o(x,y) corresponding to the pixel P[t]o(x, y):

$$M[t]o(x, y) = \frac{\sum_{j=1}^{9} |Prj - \text{Pre\_Prj}|}{\text{Threshold}}$$

Operations for generating corresponding motion factors M for interpolating other pixels of the frames Fm[t−1] to Fm[t+2] may be obtained similarly.

As mentioned, a conventional EODI engine is implemented to perform an EODI operation within a same field. Whereas, the EODI engine according to the embodiments of the invention generates interpolated double frame rate frames based on corresponding original frames. Therefore, compared to the conventional double frame rate de-interlace of the prior art with the issue of residual image resulted from directly displaying two identical frames, the de-interlacing controller according to this embodiment is not only low in cost but also has the advantage of overcoming the issue of residual image.

In addition, the de-interlacing controller according to this embodiment applies a blender to generate corresponding interpolated output image with reference to image motion degrees of the input image. Thus, utilizing the de-interlacing controller according to this embodiment, the various frames of the output image are interpolated with reference to motion degrees of the input image to further enhance display quality.

Figure 9:
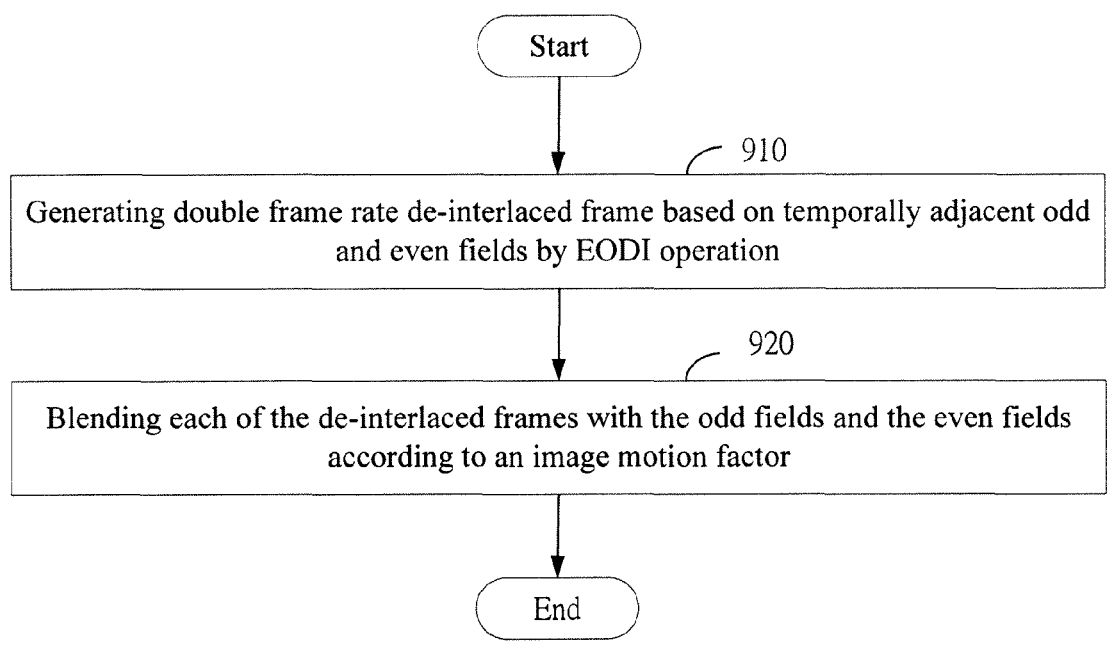
FIG. 9 is a double frame rate de-interlacing method according to one preferred embodiment of the invention.

FIG. 9 shows a double frame rate de-interlacing method according to one preferred embodiment of the invention. In Step 910, based on temporally adjacent odd and even fields, an EODI operation is performed to generate double frame rate de-interlaced frame. In Step 920, each of the de-interlaced frames is adaptively blended to generate an interpolated de-interlaced frame. For example, according to an image motion factor, each of the de-interlaced frames is blended with the odd fields and the even fields to generate de-interlaced frames. More specifically, the image motion factor is determined by a target pixel row and a plurality of spatially adjacent pixel rows of a plurality of temporally adjacent fields. For example, the image motion factor is associated with a sum of an absolute difference of pixel data of a plurality of spatially adjacent pixel rows of a plurality of temporally adjacent fields.

To sum up, the present invention discloses a double frame rate de-interlacing method, comprising steps of generating a plurality of de-interlaced frames by performing an EODI operation based on an odd field and an even field that are temporally adjacent; and adaptively blending the de-interlaced frames with the odd field and the even field to generate a plurality of interpolated frames.

The present invention further discloses a double frame rate de-interlacing controller, for generating an output image in response to an input image, the input image comprising an odd field and an even field, the output image comprising a first interpolated frame, the de-interlacing controller comprising: a memory, a control circuit, a de-interlace engine and a blender. The memory receives and stores the odd field and the even field. The control circuit reads and outputs an $i^{th}$ odd input pixel row of the odd field, an $(i+1)^{th}$ odd input pixel row of the odd field and an $i^{th}$ even input pixel row of the even field. The de-interlace engine de-interlaces based on the $i^{th}$ odd input pixel row and the $i^{th}$ even input pixel row to generate a first pixel row, and performs the EODI operation based on the $(i+1)^{th}$ odd input pixel row and the $i^{th}$ even input pixel row to generate a second pixel row. The first and second pixel rows are assigned as an $i^{th}$ odd output pixel row and an $i^{th}$ even output pixel row of the first interpolated frame, respectively. The blender determines a first weight parameter and a second weight parameter, e.g. derived from motion factor M, for the first pixel row and the $i^{th}$ odd input pixel row, to generate the $i^{th}$ odd output pixel row of the first interpolated frame and determines a third weight parameter and a fourth weight parameter for the second pixel row and the $i^{th}$ even input pixel row, to generate the $i^{th}$ even output pixel row of the first interpolated frame.

The present invention further discloses a double frame rate de-interlacing method, for generating an output image in response to an input image, the input image comprising an odd field and an even field, the output image comprising a first interpolated frame, the de-interlacing method comprising steps of: generating an $i^{th}$ odd output pixel row of the first interpolated frame by performing an edge oriented de-interlacing (EODI) operation based on an $i^{th}$ odd input pixel row of the odd field and the $i^{th}$ even input pixel row of the even field, where i is a natural number; generating an $i^{th}$ even output pixel row of the first interpolated frame by performing the EODI operation based on the $i^{th}$ even input pixel row and an $(i+1)^{th}$ odd input pixel row of the odd field; and adjusting i and repeating the above steps to obtain all odd and even output pixel rows of the first interpolated frame.

While the invention has been described in terms of what is presently considered to be the most practical and preferred embodiments, it is to be understood that the invention needs not to be limited to the above embodiments. On the contrary, it is intended to cover various modifications and similar arrangements included within the spirit and scope of the appended claims which are to be accorded with the broadest interpretation so as to encompass all such modifications and similar structures.

What is claimed is:

1. A double frame rate de-interlacing method, for generating an output image in response to an input image, the input image comprising an odd field and an even field, the output image comprising a first interpolated frame, the de-interlacing method comprising steps of:
   generating an $i^{th}$ odd output pixel row of the first interpolated frame by de-interlacing based on an $i^{th}$ input pixel row of the odd field and the $i^{th}$ input pixel row of the even field, where i is a natural number;
   generating an $i^{th}$ even output pixel row of the first interpolated frame by de-interlacing based on the $i^{th}$ input pixel row of the even field and an $(i+1)^{th}$ input pixel row of the odd field; and
   adjusting i and repeating the above steps to obtain all odd and even output pixel rows of the first interpolated frame,
   wherein the step of generating the $i^{th}$ odd output pixel row of the first interpolated frame further comprises steps of:
   generating a first pixel row by de-interlacing based on the $i^{th}$ input pixel row of the odd field and $i^{th}$ input pixel row of the even field;
   assigning the $i^{th}$ input pixel row of the odd field as a second pixel row; and
   determining a first weight parameter and a second weight parameter for the first and second pixel rows, to generate the $i^{th}$ odd output pixel row of the first interpolated frame,
   wherein a sum of the first and second weight parameters equals to 1, and the first and second weight parameters are associated with a motion degree of the input image.

2. The double frame rate de-interlacing method as claimed in claim 1, wherein the step of generating the $i^{th}$ even output pixel row of the first interpolated frame further comprises steps of:
   generating a first pixel row by de-interlacing based on the $(i+1)^{th}$ input pixel row of the odd field and the $i^{th}$ input pixel row of the even field;
   assigning the $i^{th}$ input pixel row of the even field as a second pixel row; and
   determining a first weight parameter and a second weight parameter for the first and second pixel rows, to generate the $i^{th}$ even output pixel row of the first interpolated frame.

3. The double frame rate de-interlacing method as claimed in claim 2, wherein a sum of the first and second weight parameters equals to 1, and the first and second weight parameters are associated with a motion degree of the input image.

4. The double frame rate de-interlacing method as claimed in claim 1, further comprising steps of:
   assigning the $i^{th}$ input pixel row of the odd field as an $i^{th}$ odd output pixel row of a second interpolated frame;
   $i^{th}$ generating an $^{th}$ even output pixel row of the second interpolated frame by de-interlacing based on the $i^{th}$ input pixel row of the odd field and the $(i+1)^{th}$ input pixel row of the odd field; and
   adjusting i and repeating the above steps to obtain all odd and even output pixel rows of the second interpolated frame.

5. The double frame rate de-interlacing method as claimed in claim 4, wherein the step of generating the $i^{th}$ even output pixel row of the second interpolated frame further comprises steps of:
   generating a first pixel row by de-interlacing based on the $i^{th}$ and $(i+1)^{th}$ input pixel rows of the odd field;
   assigning the $i^{th}$ input pixel row of the even field as a second pixel row; and
   determining a first weight parameter and a second weight parameter for the first and second pixel rows, to generate the $i^{th}$ even output pixel row of the second interpolated frame.

6. The double frame rate de-interlacing method as claimed in claim 5, wherein a sum of the first and second weight parameters equals to 1, and the first and second weight parameters are associated with a motion degree of the input image.

7. The double frame rate de-interlacing method as claimed in claim 1, further comprising steps of:
   generating an $i^{th}$ odd output pixel row of a third interpolated frame by de-interlacing based on the $i^{th}$ input pixel row of the even field and an $(i+1)^{th}$ input pixel row of the even field;
   assigning the $i^{th}$ input pixel row of the even field as an $i^{th}$ even output pixel row of the third interpolated frame; and
   adjusting i and repeating the above steps to obtain all odd and even output pixel rows of the third interpolated frame.

8. A double frame rate de-interlacing controller, for generating an output image in response to an input image, the input image comprising an odd field and an even field, the output image comprising a first interpolated frame, the de-interlacing controller comprising:
   a memory for receiving and storing the odd field and the even field;

a control circuit for reading and outputting an $i^{th}$ input pixel row of the odd field, an $(i+1)^{th}$ input pixel row of the odd field and an $i^{th}$ input pixel row of the even field, where i is a natural number; and a de-interlace engine for de-interlacing based on the $i^{th}$ input pixel row of the odd field and the $i^{th}$ input pixel row of the even field to generate a first pixel row, and de-interlacing based on the $(i+1)^{th}$ input pixel row of the odd field and the $i^{th}$ input pixel row of the even field to generate a second pixel row; and a blender for determining a first weight parameter and a second weight parameter for the first pixel row and the $i^{th}$ input pixel row of the odd field, to generate the $i^{th}$ odd output pixel row of the first interpolated frame and determining a third weight parameter and a fourth weight parameter for the second pixel row and the $i^{th}$ input pixel row of the even field, to generate the $i^{th}$ even output pixel row of the first interpolated frame;

wherein, the first and second pixel rows are assigned as an $i^{th}$ odd output pixel row and an $i_{th}$ even output pixel row of the first interpolated frame, respectively.

9. The double frame rate de-interlacing controller as claimed in claim 8, wherein a sum of the first and second weight parameters equals to 1, and the first and second weight parameters are associated with a motion degree of the input image; and a sum of the third and fourth weight parameters equals to 1, and the third and fourth weight parameters are associated with a motion degree of the input image.

10. The double frame rate de-interlacing controller as claimed in claim 8, wherein the $i^{th}$ input pixel row of the odd field and the $i^{th}$ even input pixel row of the even field are assigned as an $i^{th}$ odd output pixel row of a second interpolated frame and an $i^{th}$ even output pixel row of a third interpolated frame, respectively.

11. The double frame rate de-interlacing controller as claimed in claim 10, wherein the de-interlace engine de-interlaces based on the $i^{th}$ input pixel row of the odd field and the $(i+1)^{th}$ input pixel row of the odd field to generate a third pixel row, and de-interlaces based on the $i^{th}$ input pixel row of the even field and the $(i-1)^{th}$ input pixel row of the even filed to generate a fourth pixel row;

wherein, the third and fourth pixel rows are assigned as an $i^{th}$ even output pixel row of the second interpolated frame and an $i^{th}$ odd output pixel row of the third interpolated frame, respectively.

* * * * *